US009869120B2

(12) United States Patent
Wilder et al.

(10) Patent No.: US 9,869,120 B2
(45) **Date of Patent: *Jan. 16, 2018**

(54) PROGRAMMING OF PAIRED AUTHORIZATION CODES IN WIRELESS TRANSMITTER AND BARRIER OPERATOR PRIOR TO USE BY END USER

(71) Applicant: Overhead Door Corporation, Lewisville, TX (US)

(72) Inventors: Steven E. Wilder, Ashland, OH (US); Tom Deneen, Akron, OH (US); Tim Ikeler, Massillon, OH (US)

(73) Assignee: Overhead Door Corporation, Lewisville, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/132,069

(22) Filed: Apr. 18, 2016

(65) Prior Publication Data

US 2016/0230442 A1 Aug. 11, 2016

Related U.S. Application Data

(63) Continuation of application No. 13/944,706, filed on Jul. 17, 2013, now Pat. No. 9,316,038.
(Continued)

(51) Int. Cl.
*G05B 19/00* (2006.01)
*E05F 15/77* (2015.01)
(Continued)

(52) U.S. Cl.
CPC ............ *E05F 15/77* (2015.01); *E05F 15/668* (2015.01); *G07C 9/00817* (2013.01);
(Continued)

(58) Field of Classification Search
CPC ..... E05F 15/77; E05F 15/668; G07C 9/00817
(Continued)

(56) References Cited

U.S. PATENT DOCUMENTS 3,676,645 A 7/1972 Fickenscher et al.
3,959,629 A 5/1976 Specht et al.
(Continued)

OTHER PUBLICATIONS

International Search Report dated Oct. 9, 2014 in corresponding application No. PCT/US2014/027355, 6 pages.
(Continued)

*Primary Examiner* — Kerri McNally
(74) *Attorney, Agent, or Firm* — Gardere Wynee Sewell LLP

(57) ABSTRACT

Disclosed herein is a method including manufacturing a barrier opening system comprising a barrier operator, and at least one wireless transmitter for wirelessly transmitting commands to the barrier operator. Prior to delivery of the barrier opening system to an end user, an authorization code is programmed into the at least one wireless transmitter. Also prior to delivery of the barrier opening system to the end user, the barrier operator is placed into a learn mode. The authorization code is then transmitted to the barrier operator while the barrier operator is in the learn mode, using a transmitter external to the barrier opening system. The barrier operator then exits the learn mode. The barrier operator is thereafter packaged together the at least one wireless transmitter.

21 Claims, 5 Drawing Sheets

Related U.S. Application Data

(60) Provisional application No. 61/798,989, filed on Mar. 15, 2013.

(51) Int. Cl.
*E05F 15/668* (2015.01)
*G07C 9/00* (2006.01)

(52) U.S. Cl.
CPC .................. *E05Y 2900/106* (2013.01); *G07C 2009/00849* (2013.01); *G07C 2009/00928* (2013.01)

(58) Field of Classification Search
USPC .......................................................... 340/5.23
See application file for complete search history.

(56) References Cited

U.S. PATENT DOCUMENTS

| | | | | |
|---|---|---|---|---|
| 4,064,487 | A | 12/1977 | Russell et al. | |
| 4,241,540 | A | 12/1980 | Depperman | |
| 4,254,582 | A | 3/1981 | McGee | |
| 4,464,651 | A | 8/1984 | Duhame | |
| 4,529,980 | A | 7/1985 | Liotine et al. | |
| 4,535,222 | A | 8/1985 | Moen | |
| 4,750,118 | A | 6/1988 | Heitschel et al. | |
| 4,775,786 | A | 10/1988 | Yamano et al. | |
| 4,819,379 | A | 4/1989 | Kenzelmann et al. | |
| 4,885,872 | A | 12/1989 | Chang et al. | |
| 4,988,922 | A | 1/1991 | Shoda et al. | |
| 5,010,688 | A | 4/1991 | Dombrowski et al. | |
| 5,028,919 | A | 7/1991 | Hidaka | |
| 5,278,547 | A | 1/1994 | Suman et al. | |
| 5,379,453 | A | 1/1995 | Tigwell | |
| 5,442,340 | A | 8/1995 | Dykema | |
| 5,473,318 | A | 12/1995 | Martel | |
| 5,479,155 | A | 12/1995 | Zeinstra et al. | |
| 5,489,763 | A | 2/1996 | Conrad et al. | |
| 5,533,561 | A | 7/1996 | Forehand, IV | |
| 5,583,485 | A | 12/1996 | Van Lente et al. | |
| 5,589,747 | A | 12/1996 | Utke | |
| 5,614,891 | A | 3/1997 | Zeinstra et al. | |
| 5,777,315 | A | 7/1998 | Wilz et al. | |
| 5,793,300 | A | 8/1998 | Suman et al. | |
| 6,081,203 | A | 6/2000 | Fitzgibbon | |
| 6,249,673 | B1 | 6/2001 | Tsui | |
| 6,271,765 | B1 | 8/2001 | King et al. | |
| 6,310,548 | B1 | 10/2001 | Stephens, Jr. et al. | |
| 6,362,771 | B1 | 3/2002 | Schofield et al. | |
| 6,374,543 | B1 | 4/2002 | Bishai | |
| 6,414,587 | B1 | 7/2002 | Fitzgibbon | |
| 6,525,645 | B2 | 2/2003 | King et al. | |
| 6,529,154 | B1 | 3/2003 | Schramm, Jr. et al. | |
| 6,597,465 | B1 | 7/2003 | Jarchow et al. | |
| 6,667,684 | B1 | 12/2003 | Waggamon et al. | |
| 6,756,895 | B2 | 6/2004 | Study et al. | |
| 6,839,133 | B2 | 1/2005 | Gehring | |
| 6,847,303 | B2 | 1/2005 | Hoermann | |
| 6,873,824 | B2 | 3/2005 | Flick | |
| 7,068,181 | B2 | 6/2006 | Chuey | |
| 7,135,957 | B2 | 11/2006 | Wilson | |
| 7,161,466 | B2 | 1/2007 | Chuey | |
| 7,269,416 | B2 | 9/2007 | Guthrie et al. | |
| 7,515,063 | B2 | 4/2009 | Brundula | |
| 7,864,070 | B2 | 1/2011 | Witkowski et al. | |
| 8,111,133 | B2 | 2/2012 | Rodriguez et al. | |
| 8,384,513 | B2 | 2/2013 | Witkowski | |
| 8,403,022 | B2 | 3/2013 | Womacks | |
| 8,552,842 | B2 | 10/2013 | Naval et al. | |
| 8,810,433 | B1 | 8/2014 | Aarons | |
| 8,976,002 | B2 | 3/2015 | Tsui et al. | |
| 8,981,898 | B2 | 3/2015 | Sims et al. | |
| 8,991,700 | B2 | 3/2015 | Harbison et al. | |
| 9,316,038 | B2 * | 4/2016 | Wilder | E05F 15/77 |
| 2002/0014954 | A1 | 2/2002 | Fitzgibbon et al. | |
| 2003/0174045 | A1 | 9/2003 | Zhang | |
| 2003/0214385 | A1 | 11/2003 | Murray | |
| 2004/0085185 | A1 * | 5/2004 | Waggamon | G07C 9/00309 340/5.7 |
| 2004/0257198 | A1 * | 12/2004 | Mullet | G05B 19/0425 340/5.71 |
| 2004/0257200 | A1 | 12/2004 | Baumgardner et al. | |
| 2005/0012631 | A1 | 1/2005 | Gregori et al. | |
| 2005/0184854 | A1 | 8/2005 | Mullet et al. | |
| 2006/0091842 | A1 | 5/2006 | Nishiyama | |
| 2007/0046231 | A1 | 3/2007 | Mullet et al. | |
| 2007/0046232 | A1 | 3/2007 | Mullet et al. | |
| 2007/0167138 | A1 | 7/2007 | Bauman et al. | |
| 2007/0185597 | A1 | 8/2007 | Bejean et al. | |
| 2008/0062000 | A1 | 3/2008 | Styers et al. | |
| 2008/0079570 | A1 | 4/2008 | Fineman et al. | |
| 2008/0164973 | A1 | 7/2008 | Mamaloukas | |
| 2009/0096606 | A1 | 4/2009 | Janov et al. | |
| 2010/0060505 | A1 | 3/2010 | Witkowski et al. | |
| 2010/0297941 | A1 | 11/2010 | Doan et al. | |
| 2011/0210848 | A1 * | 9/2011 | Howard | G08B 21/0247 340/539.32 |
| 2011/0311052 | A1 | 12/2011 | Myers et al. | |
| 2012/0163599 | A1 | 6/2012 | Ware et al. | |
| 2013/0328663 | A1 | 12/2013 | Ordaz | |
| 2014/0184080 | A1 | 7/2014 | Rybicki et al. | |

OTHER PUBLICATIONS

Written Opinion dated Oct. 9, 2014 in corresponding application No. PCT/US2014/027355, 7 pages.

* cited by examiner

PROGRAMMING OF PAIRED AUTHORIZATION CODES IN WIRELESS TRANSMITTER AND BARRIER OPERATOR PRIOR TO USE BY END USER

RELATED APPLICATION

This application is a continuation of U.S. application Ser. No. 13/944,706, entitled "Factory programming of paired authorization codes in wireless transmitter and door operator", which was filed Jul. 17, 2013, now U.S. Pat. No. 9,316,038, which itself claims priority to U.S. Provisional Application No. 61/798,989, filed Mar. 15, 2013, the contents and disclosures of both of which are hereby incorporated by reference in their entirety.

FIELD OF THE INVENTION

This invention pertains to barrier opening systems, and more particularly to the pairing of wireless transmitters with the barrier operator of a barrier opening system.

BACKGROUND

Barrier opening systems, particularly garage door opening systems, present numerous issues for operation. Present day garage door opening systems include, inter alia, remotely located wireless signal transmitters (for wirelessly generating door instruction signals); a garage door operator, usually of the ceiling-mounted power head type, or of the jackshaft type, with a wireless signal receiver, microcontroller or similar computer processor, associated memory, and a motor controller (for respectively receiving, storing, and processing the wireless transmitter door instruction signals, and generating motor control signals corresponding thereto); and a motor mechanically coupled with the door (for opening, closing, and/or halting movement of, the garage door in response to the respectively generated motor control signals.)

Wireless transmitters include those that are hand-held, automobile mounted, and/or mounted on the interior and/or exterior walls of the garage. As generally known, the user typically selectively depresses buttons or switches on the transmitter to activate and send these door instruction signals to the door operator, the signals normally encoded in a manner to avoid their capture by codegrabbers. These door instruction signals will hereinafter be referred to in the specification and claims as "encoded access control signals."

To prevent the door operator from responding to a neighbor's or a stranger's unauthorized transmitter, the door operator is typically programmed by the user to respond to encoded access control signals from only authorized transmitters. This is typically accomplished by the transmitter user initially transmitting a code for storage in the door operator's memory that corresponds to the authorization code stored in each transmitter that is to be authorized to communicate with that door operator. This procedure thereby establishes the exclusive pairing of the door operator with only those transmitter(s) that are authorized to communicate with it. Therefore, the term "authorization code" shall be defined, and referred to throughout the specification and claims, as a code that (i) is identical to a code that is stored in both the door operator and in each transmitter that is to be paired, and therefore authorized to communicate, with the door operator, and (ii) must be stored in the door operator and in such authorized transmitter(s) before the door operator can be operative to move the door in response to door instruction signals transmitted by such transmitter(s).

Currently, the typical approach for programming the authorization codes in the door operator is for the end user or installer of the door operator, prior to its operation, to place its microcontroller into the "learn" mode, and then actuate a wireless transmitter in which the authorization code has been stored, to transmit the identical code for storage within the door operator's memory, thus establishing the desired pairing between that transmitter and the door operator. After such pairing operation with respect to all transmitters to communicate with that door operator, the door operator's microcontroller is moved out of its "learn" mode to its "operate" mode, and the door operator is ready for operation.

While this method is designed to accomplish the intended purpose—pre-operation operator/transmitter pairing, there are disadvantages from the standpoint of user convenience. For example, experience has shown that the programming instructions regarding this initial pairing operation have tended to confuse the end user, resulting in the operator not being programmed with an authorization code, therefore being inoperative, and the end user falsely concluding that the non-operative garage door closing system is defective. Thus, it is the principal purpose of this invention to provide a new and improved, and more reliable, method of pairing authorized wireless transmitters with their designated door operator, and without user inconvenience or confusion.

SUMMARY

Accordingly, the principal aspect of the method described herein is to pair one or more selected wireless transmitters with the door operator, by pre-programming the authorization code(s) of each transmitter into the door operator that are to be authorized to communicate with such operator, prior to the installation and/or use of the door opening system by the end user. In particular, this pairing or pre-programming is effected at the factory as part of the overall manufacturing process.

In accordance with a specific embodiment of this method, one or more assembled wireless transmitters, pre-programmed during their manufacture with their respective unique authorization code, are selected for pairing with a garage door operator of the power head type while still at the factory. Coded information representative of these authorization codes are then stored in a database for subsequent transfer to, and pre-programming of, the power head unit. The power head is thereafter moved into its "learn" mode, and the stored authorization codes in the database are retrieved and transmitted for storage within the power head, all within the factory environment. The door operator is consequently paired with all the selected wireless transmitters containing the respective authorization code(s), and the pre-programmed transmitters and paired pre-programmed door operator are packaged together and shipped for eventual distribution to the end user, who may now proceed with the installation and operation of the door operator without the need for any pre-operation pairing.

In accordance with a particular feature of this embodiment, the actuation of the door operator between the "learn" and "operate" modes may be effected mechanically (e.g., manually). Alternatively, a manufactured transmitter can transmit three different sequential code commands to the power head, a first code command instructing the power head to move into the "learn" mode, a second code command, instructing the microprocessor to retrieve the authorization code(s) of the manufactured transmitters from the database and transmit them for storage in the power head's memory, and a third code command, returning the power head to the "operate" mode.

The foregoing and other details and features, as well as the advantages, of the disclosed method will become more readily understood and apparent from the following detailed description, taken in conjunction with the accompanying drawings. The detailed description and drawings are merely illustrative of embodiments of the underlying invention, the scope of the invention being defined solely by the appended claims and equivalents thereof.

BRIEF DESCRIPTION OF THE DRAWINGS

Embodiments illustrated by way of example in the accompanying drawings are not necessarily drawn to scale, and certain portions may be exaggerated in order to emphasize certain features. Accordingly.

DETAILED DESCRIPTION

The terms "power head" and "power head unit," as used in the specification and claims, refer to, and are defined, as an enclosed garage door operator, typically suspended from the garage ceiling, and including a receiver, memory, controller, motor controller, and motor respectively carrying out the defined functions (e.g., the storage of codes in the power head unit means the storage of codes in the unit's memory.)

Figure 1:
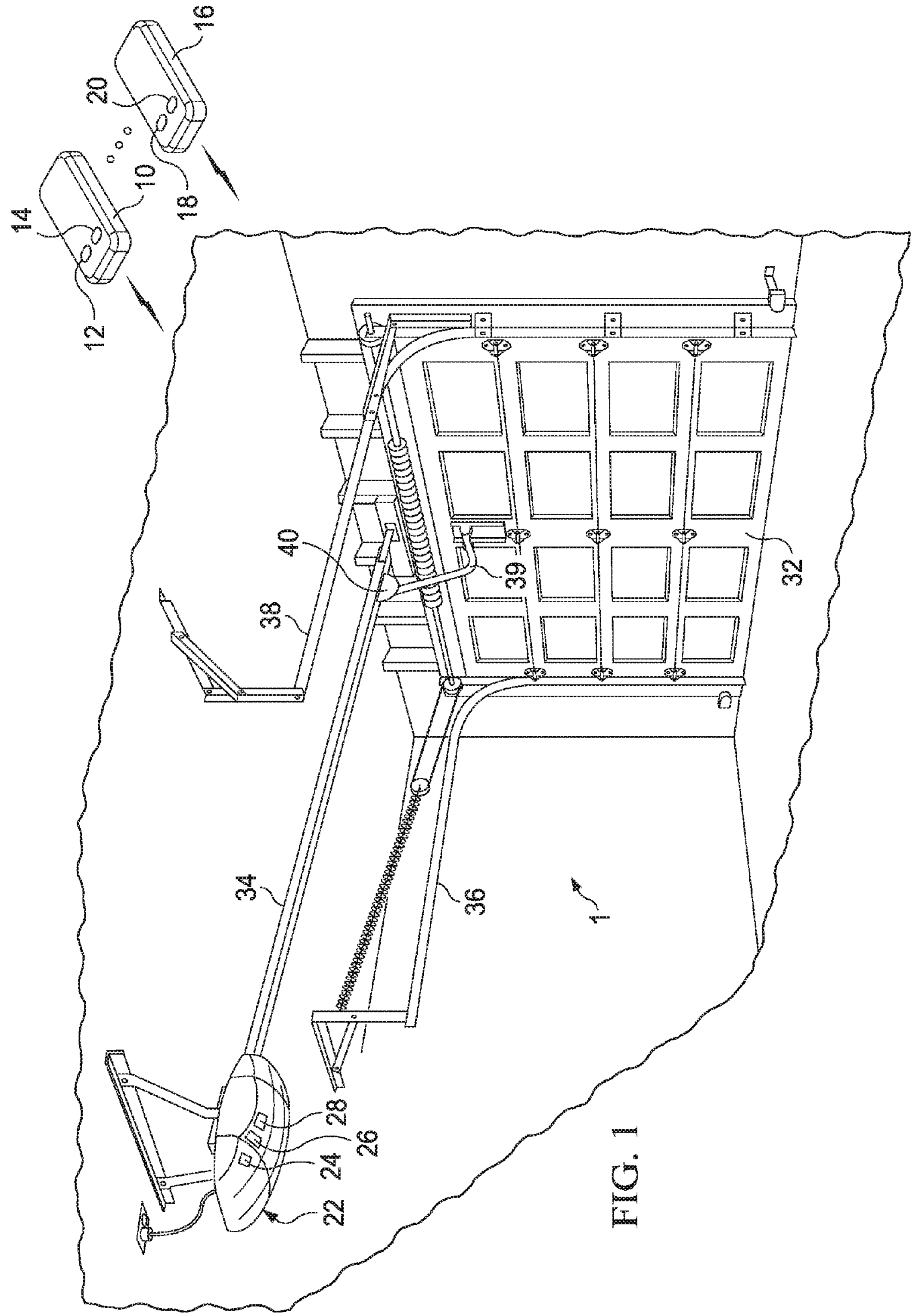
FIG. 1 is a diagram of a typical garage door opening system.

Referring initially to FIG. 1, a typical garage door opening system 1 utilizing a door operator of the power head type is depicted. This system 1 is generally known in the art and may be the same as, or similar to, the one described and illustrated in U.S. Pat. No. 6,634,408 ("the '408 patent"), assigned to the assignee of the present invention, the details of which are incorporated herein by reference for all purposes. In accordance with the system depicted in FIG. 1, a power head unit 22 is attached to the garage ceiling and encloses and constitutes the "brains" of the garage door operator, receiving instructions from user-operated wired and wireless barrier-opener wall consoles (not shown) affixed at the interior and exterior of the garage, as well as from remotely located wireless RF transmitters, for example of the hand-held type shown in the drawing of FIG. 1 as items 10 and 16.

Figure 2:
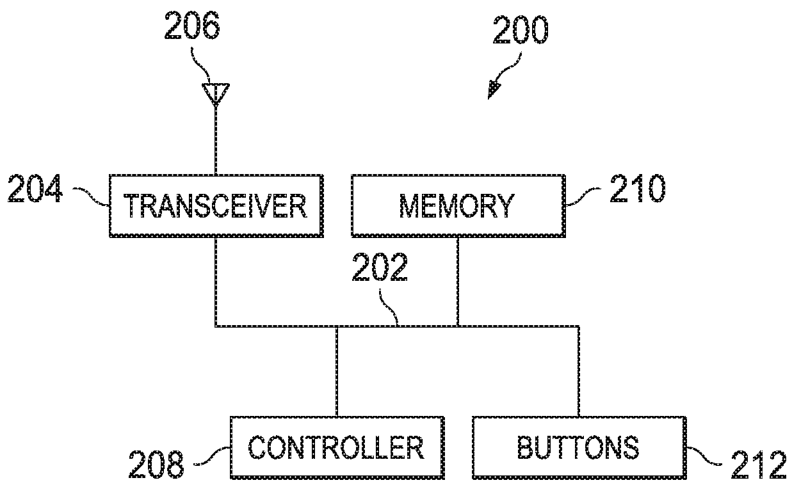
FIG. 2 is a block diagram of a wireless transmitter for a garage door opening system, according to one embodiment thereof.

Accordingly, as generally known in the industry, and as illustrated in FIG. 2, each wireless transmitter 10 or 16 typically has the configuration 200 and includes a memory 210 (for storing the codes determining the signals to be transmitted by transceiver 204 from the antenna 206), a controller 208, which may be a microprocessor, microcontroller, or the like, that responds to the depression of buttons/switches 212 (corresponding to buttons 12, 14, 18&20 in FIG. 1) by the user to transmit the wireless RF door instruction signals corresponding to the stored codes, instructing the movement of the garage door.

Figure 3:
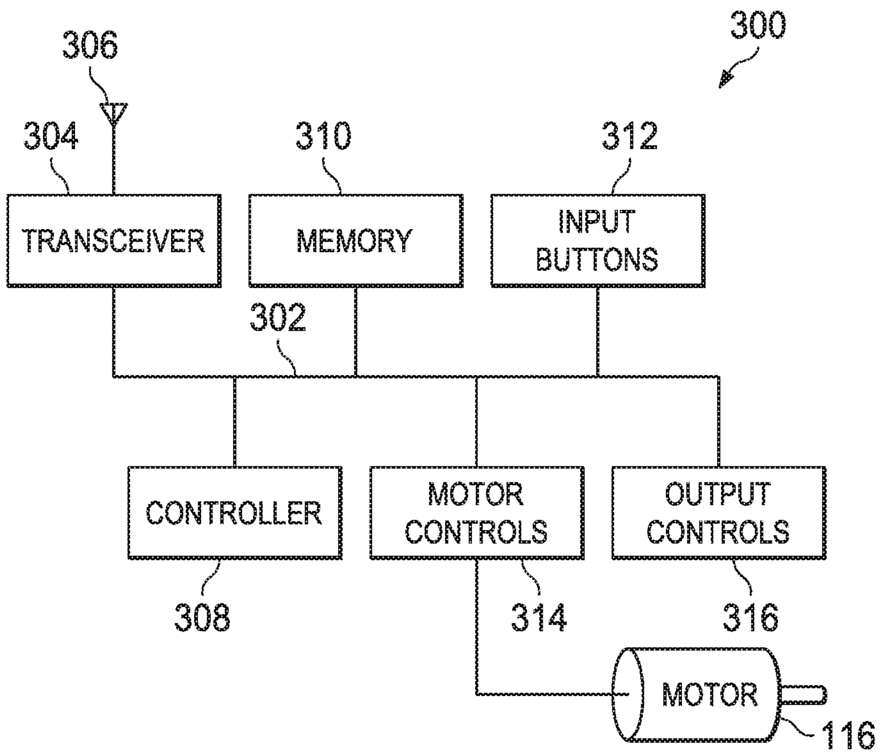
FIG. 3 is a block diagram of a garage door operator of the power head type for a garage door opening system, according to one embodiment thereof.

Also, as generally known in the industry, and as illustrated in FIG. 3, a power head unit 22 typically has the configuration 300 and includes a wireless signal receiver (or transceiver) 304 for receiving the wireless transmissions from transmitters 10 and 16 by way of antenna 306, a controller 308, which typically may be a programmable microprocessor, microcontroller, or the like, for storing incoming coded data in associated memory 310, and for processing the incoming door instruction signals to regulate the operation of motor 116 by way of motor controller 314.

Under such controls, the motor 116 is effective to drive an endless chain (not shown) or other connector, like a belt or screw, along rail 34. The chain is operably connected through carriage 40 to one end of link 39, link 39 attached at its opposed end to the door 32. Accordingly, as a consequence of the motor driving the endless chain, garage door 32 would be moved between open and closed positions, the door guided along spaced tracks 36 and 38.

As conventionally known in the art, the signals from wireless transmitters 10 and 16 are generally in a certain frequency range (e.g., 300-400 MHz) and typically include an initial authorization code portion followed by an encrypted access control code portion. While various types of coding formats may be used for these signals, in the specific embodiment now described, these signals are of the type currently used by Overhead Door Corporation and Genie, and known in the industry by the INTELLICODE I® trademark. The details of this coding structure are described in U.S. Pat. No. 6,049,289 ("the '289 patent"), assigned to the assignee of the present invention, and incorporated herein in its entirety. In such coding, the authorization code comprises (i) a unique transmitter identification code, namely the transmitter serial number, and (ii) one or more function codes, specifically button values of the transmitter, and the encoded access control code portion is a randomly generated multi-bit hopping code Alternatively, the authorization code may refer to any specific identifier value of a transmitter, represented, for example, as a binary, hexadecimal, numeric, alphanumeric, or other known (or to be known) form. The transmitted signals may also include serialized quick turn programming ("SQTP") data, one or more algorithmic routines, controller-specific keys (i.e., values specific to a particular PICO controller or microcontroller), or the like. SQTP data may be used and programmed, for example, by a PICO microcontroller.

In order for the garage door opening system 1 to operate as intended, the authorization codes that are resident in the transmitters 10 and 16 must be identical to the corresponding codes that are resident in the garage door operator power head unit 22. In particular, and relevant to the process described herein, the authorization code associated with each transmitter that is to be paired with a specific power head unit must have an identical authorization code stored in the power head unit (i.e., in its memory) in order to enable operation of the garage door opening system 1. Indeed, it is this matching that enables the operation of the door operator, whether the door operator is of the described power head type, jackshaft type, or otherwise. As explained above, existing methods of achieving this pairing required the user or the installer to program these codes after the equipment left the factory and was delivered to the user.

However, in accordance with the method of the invention, the required pairing is carried out prior to the delivery of the garage door operator to the user, and specifically at the factory, as part of the overall door opening system manufacturing process. Accordingly, with reference to FIG. 4, one embodiment of the process of this invention for effecting this pairing is now described. Environment 452 represents a manufacturing or factory facility, or a portion of a manufacturing or factory facility, where a constructed wireless transmitter 402, representative of those to be paired with a particular power head unit, is pre-programmed with an authorization code. Environment 400 represents a separate manufacturing or factory facility, or a different portion of the same manufacturing or factory facility, where this authorization code is pre-programmed into the door operator power head.

Accordingly, and as schematically illustrated, transmitter 402 sequentially proceeds through three different stations along production path 450 in environment 452. At the first station, transmitter 402 has its authorization code pre-programmed into its memory. While any format of authorization code may be used, in accordance with the use of the INTELLICODE I® format of this embodiment, the authorization would include (i) as a unique transmitter identification code, the serial number portion of the INTELLICODE® signal, and (ii) a function code, namely the button values of the INTELLICODE® signal. Transmitter 402, after such pre-programming, is then advanced to a second station where, by depression of buttons 404 & 406, the authorization code is wirelessly transferred to a wireless receiver unit 418, the authorization code data thereafter routed from the receiver 418 to a printer 420.

Transmitter 402 is then advanced to a third position, where printer 420 prints a label 428 with appropriately encoded indicia (e.g., bar code data) corresponding to the received authorization code. The so-encoded label is then attached to the transmitter 402 that is to be paired with power head unit 408, to the packaging for transmitter 402, and/or to a pallet upon which the transmitters that have been selected to be paired with a particular power head unit are placed. It is to be understood that printer 420, instead of printing a label with the coded data, may alternately print the encoded indicia directly on the transmitter 402 itself in the field 428.

The transmitter 402, with the encoded data so applied, is thereafter moved to a different manufacturing or factory environment 400 where a scanner 422 scans the printed indicia on the transmitter (or label) corresponding to the authorization code. The scanned authorization code, under control of computing device 424, is then transmitted by way of network 430 to server 432 for storage in its database 434. Network 430 may be, without limitation, one or more local area networks ("LANs"), wide area networks ("WANs"), private virtual networks ("PVNs"), public networks, or the like, currently known to persons of ordinary skill in the art. Such are commonplace in enterprise—wide computer networks, intranets, and the Internet.

The computing device 424 may be, without limitation, one of the many different types of computer processors known to those of ordinary skill in the art, such as a programmable microcontroller, with associated memory. Receiver 418 may be a portion of a standalone control device or may be controlled by the computing device 424.

Figure 4:
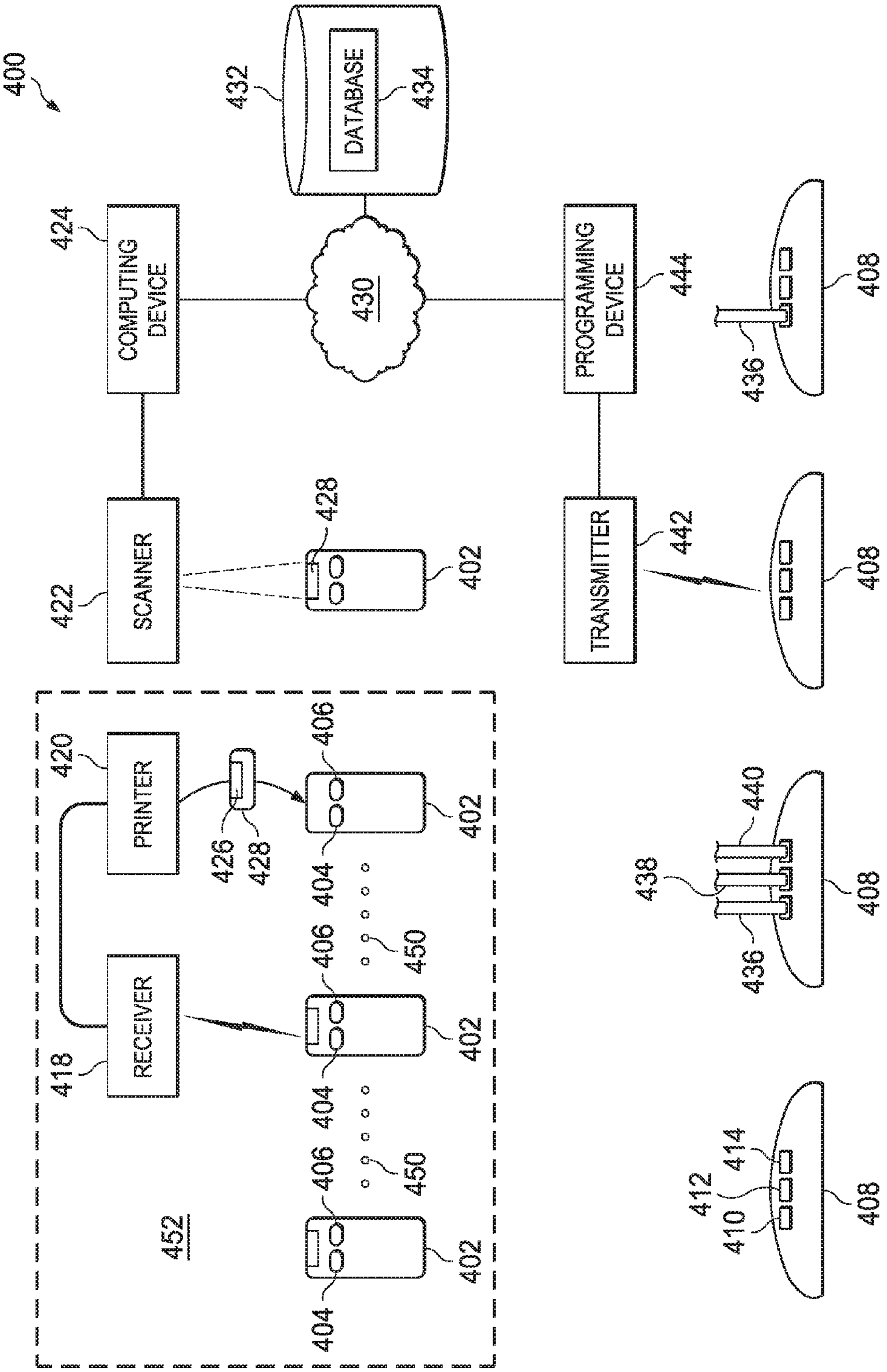
FIG. 4 is a block diagram illustrating a method for pre-programming at the factory a power head type garage door operator as part of the overall manufacturing process so as to pre-pair selected wireless transmitters with the power head prior to delivery of the system to the customer.

Referring still to FIG. 4, power head unit 408 represents the unit to which transmitter 402 is to be paired, and is schematically depicted in different stages. Accordingly, in the first stage, power head unit 408 is depicted with program buttons/switches 410, 412 and 414 (respectively corresponding to buttons/switches 24, 26, and 28 of FIG. 1), the selective depression of which either moving the power head processor into the learn mode from the operate mode, or out of the learn mode back to the operate mode, as subsequently described. Accordingly, in the next stage (second depiction of power head 408), mechanical arms 436, 438 and 440 respectively depress buttons/switches 410, 412 and 414, thereby placing the power head 408 into its learn mode. Under the control of programming device 444, each authorization code(s) is then retrieved from database 434 by way of network 430, routed to transmitter 442, and at a next stage, the transmitter 442 is actuated to transmit each authorization code (i.e., the unique transmitter identification code and the function code) to the power head unit 408, for storage in the power head unit's memory.

In a final stage, mechanical arm 436 depresses button/switch 410 to move the power head unit 408 out of learn mode and into the operate mode. The so programmed power head unit 408, and all of the other wireless transmitters 402 that have their authentication programmed for pairing with the power head unit 408, are then packaged together and shipped from the manufacturing facility 400 for eventual distribution to the end user. Given that the power head unit 408 and all the packaged transmitters have been pre-paired with matching authorization codes, the end user then only needs to unpackage the components, and the garage door operator is ready for operation without any further pairing required.

Figure 5:
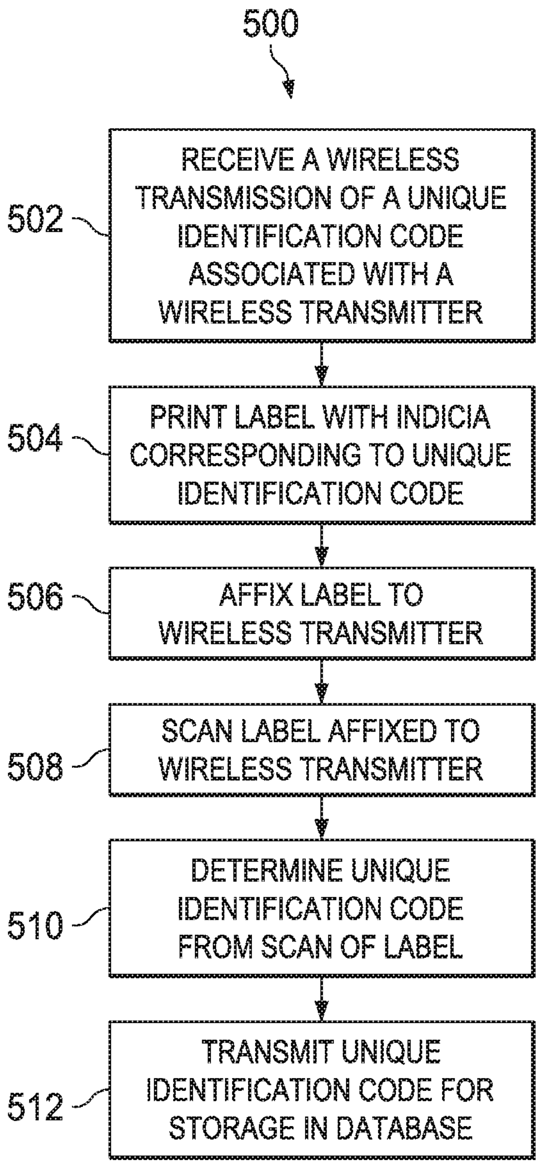
FIGS. 5 & 6 are flow charts of the method illustrated in FIG. 4.
Figure 6:
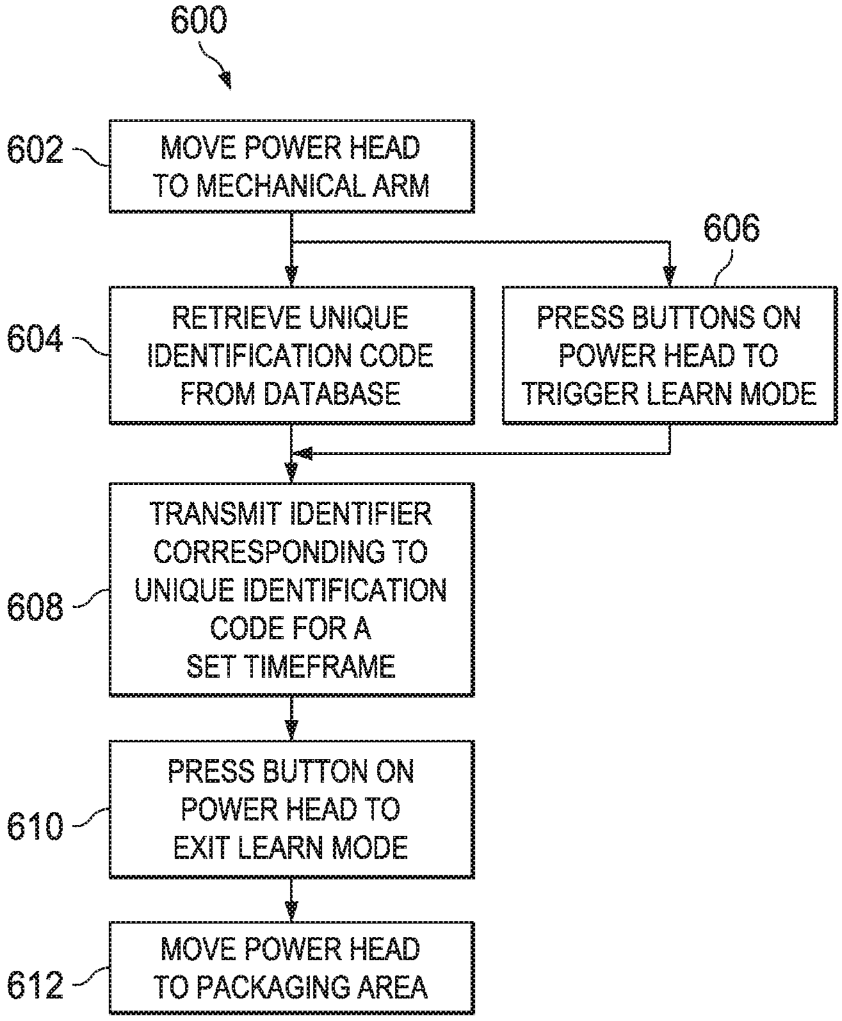

FIG. 5 is a flow chart representation 500 of the steps by which the computing device 424 may be programmed, with steps 502, 504, 506, 508, 510 and 512 respectively corresponding to the previously described sequential functions with respect to transmitter 402. FIG. 6 is a flow chart representation 600 of the principal steps 602, 604, 606, 608, 610 and 612 respectively corresponding to the previously described sequential functions with respect to power head unit 408.

Various modifications to the previously described embodiment may be made by one of ordinary skill in the art without departing from the principles of the method of the invention. For example, while the placement of the power head unit 408 into and out of the "learn" mode has been effected by the manual depression of buttons/switches on the power head, such may also be accomplished by the remote transmission of a plurality of sequential signal codes, each code respectively and sequentially placing the power head into the learn mode, transferring and storing of the authorization code, and moving the power head out of the learn mode back to its operating mode.

Also, while receiver 418, printer 420, scanner 422, computing device 424, server 432, test transmitter 442, and programming device 444 are depicted as separate equipment, some or all of these components may be included in a single item of equipment. Also, indicia 426, while disclosed as being in bar code format, may alternatively be in other coded formats, such as infrared marking, radio frequency identification coding ("RFID"), alphanumeric identifier, watermark, or other graphic marking indicating the authorization code. Moreover, instead of affixing a printed label that is thereafter scanned, a suitable alternative may be to simply transmit the authorization code received by receiver 418 directly to server 432 for storage in database 434.

Various other modifications and additions to the disclosed embodiment will become apparent to those of ordinary skill in the art without departing from the spirit and scope of the invention as defined solely by the appended claims.

The invention claimed is:

1. A method comprising:

manufacturing a barrier opening system comprising a barrier operator, and at least one wireless transmitter for wirelessly transmitting commands to the barrier operator;

prior to delivery of the barrier opening system to an end user, programming an authorization code into the at least one wireless transmitter;

prior to delivery of the barrier opening system to the end user, placing the barrier operator into a learn mode;

prior to delivery of the barrier opening system to the end user, transmitting the authorization code to the barrier operator while the barrier operator is in the learn mode, using a transmitter external to the barrier opening system;

prior to delivery of the barrier opening system to the end user, causing the barrier operator to exit the learn mode; and prior to delivery of the barrier opening system to the end user, packaging the barrier operator together the at least one wireless transmitter.

2. The method of claim 1, wherein the barrier operator is placed into the learn mode via mechanical actuation of a switch on the barrier operator.

3. The method of claim 2, wherein the switch comprises a button.

4. The method of claim 1, wherein the barrier operator is placed into the learn mode via receipt of a wireless program signal.

5. The method of claim 1, further comprising configuring an identifying device to store the authorization code, and affixing the identifying device to either the at least one wireless transmitter, or a packaging for the at least one wireless transmitter, prior to delivery of the barrier opening system to the end user.

6. The method of claim 5, wherein the identifying device comprises a label having coded indicia thereon representing the authorization code.

7. The method of claim 5, wherein the identifying device is affixed while the transmitter is at a first location; and further comprising reading the authorization code from the identifying device and storing the authorization code in a database, while the transmitter is at a second location different from the first location.

8. The method of claim 1, further comprising printing coded indica representing the authorization code on the at least one wireless transmitter.

9. The method of claim 1, wherein the authorization code is retrieved from a database prior to transmission to the barrier operator.

10. A method of programming a barrier opening system comprising a barrier operator, and a plurality of wireless transmitters for wirelessly transmitting commands to the barrier operator, the method comprising:

prior to unpacking of the barrier opening system by an end user, programming a different unique authorization code into each of the wireless transmitters;

prior to unpacking of the barrier opening system to the end user, transmitting each unique authorization code to the barrier operator, using a transmitter external to the barrier opening system, such that the barrier opening system learns each unique authorization code; and packaging the barrier opening system together for delivery to the end user.

11. The method of claim 10, further comprising, prior to unpacking of the barrier opening system to the end user, placing the barrier operator into a learn mode.

12. The method of claim 11, wherein the barrier operator is placed into the learn mode through the use of at least one mechanical arm.

13. The method of claim 11, wherein the barrier operator is placed into the learn mode via receipt of a wireless program signal.

14. The method of claim 10, further comprising configuring a plurality of identifying devices to each store one of the unique authorization codes, and associating each of the plurality of identifying devices to a respective wireless transmitter of the plurality thereof, prior to delivery of the barrier opening system to the end user.

15. The method of claim 14, wherein each identifying device comprises a label.

16. The method of claim 14, wherein each identifying device is affixed to a respective wireless transmitter while that transmitter is at a first location; and further comprising reading the unique authorization code from each identifying device and storing the unique authorization code in a database, while that transmitter is at a second location different from the first location.

17. The method of claim 1, further comprising printing coded indicia representing a respective unique authorization code on each wireless transmitter.

18. The method of claim 17, wherein each coded indicia is printed on its respective wireless transmitter while that transmitter is at a first location; and further comprising reading the unique authorization code from each wireless transmitter and storing the unique authorization code in a database, while that transmitter is at a second location different from the first location.

19. The method of claim 10, wherein each of the unique authorization codes comprises a serial number and one or more secret keys.

20. The method of claim 10, wherein the transmitter external to the barrier opening system comprises a low-powered personal area network wireless transmitter.

21. A method for a manufacturer of door operators to pre-pair an authorization code of a wireless transmitter with the door operator prior to delivery of the door operator and the wireless transmitter to a user thereof, comprising:

in a manufacturing facility, prior to said delivery:

applying a machine readable representation of the said authorization code to an exterior surface of the wireless transmitter;

reading the authorization code from the surface and storing the authorization code into a database of a server;

programming said authorization code into the memory of said wireless transmitter;

retrieving the authorization code from the database for storage into the memory of the door operator;

storing the same authorization code into the memory of the door operator; and packaging the so-paired wireless transmitter and the door operator into a package for delivery to user, thereby enabling the installation and use of the coded door operator without the user needing to pair the wireless transmitter with the door operator.

* * * * *